Jan. 21, 1941.   H. G. LEHMANN   2,229,174
CIGAR LIGHTER
Filed Dec. 31, 1937   2 Sheets-Sheet 1
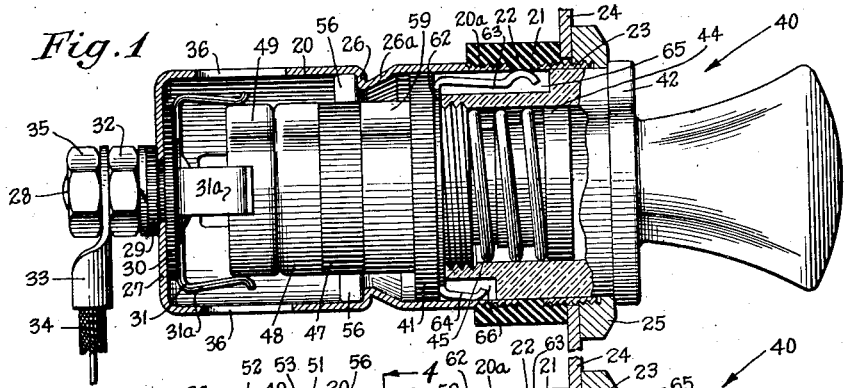
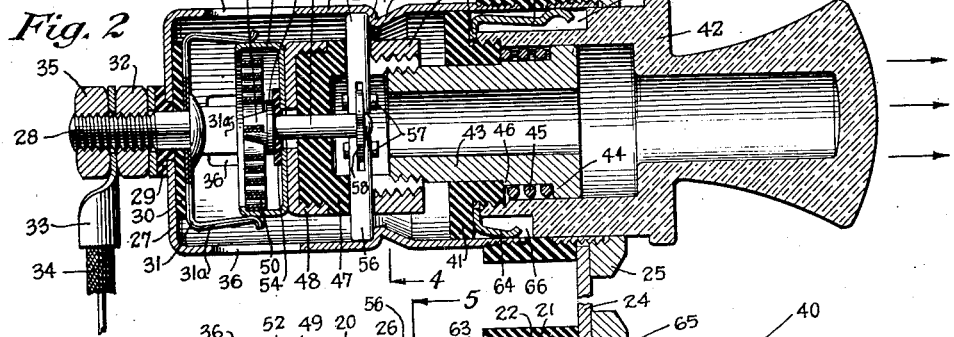
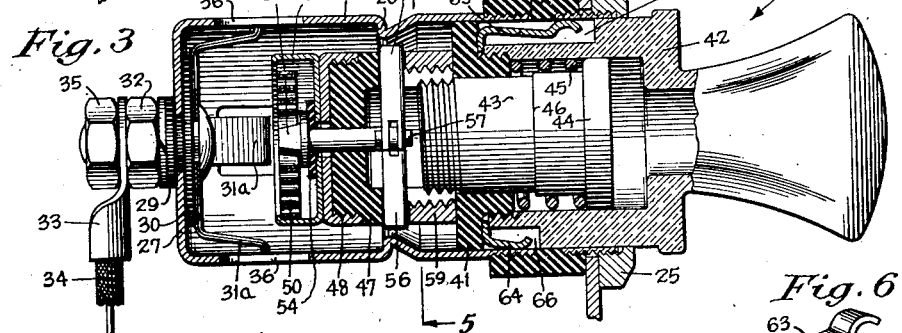
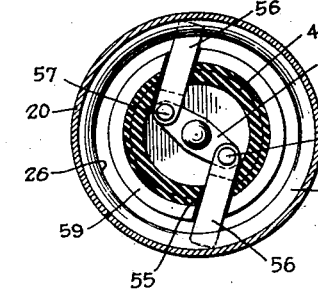
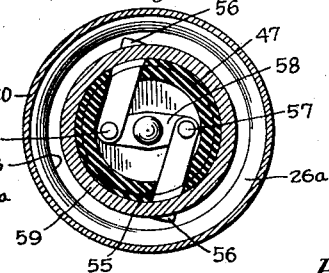
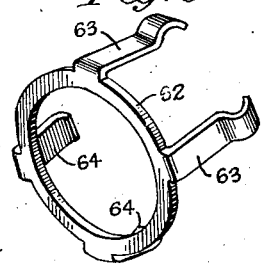
INVENTOR
*Herbert G. Lehmann,*
BY
ATTORNEY Jan. 21, 1941.  H. G. LEHMANN  2,229,174
CIGAR LIGHTER
Filed Dec. 31, 1937  2 Sheets-Sheet 2
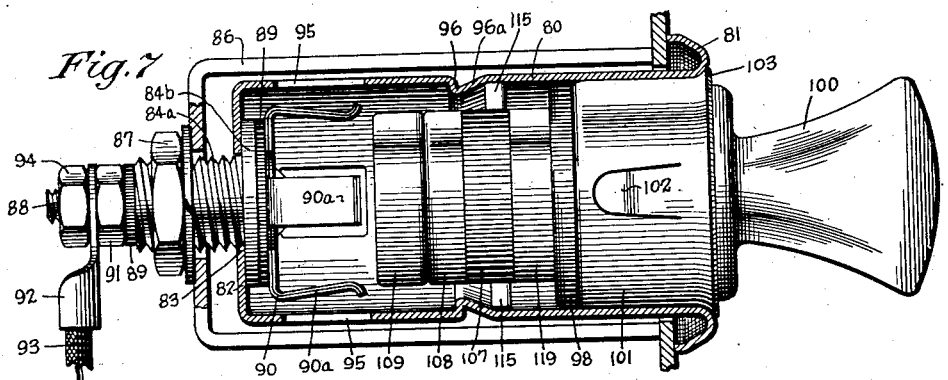
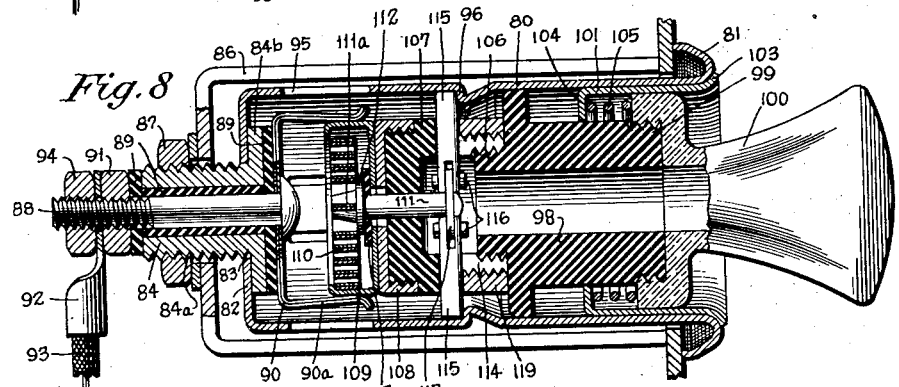
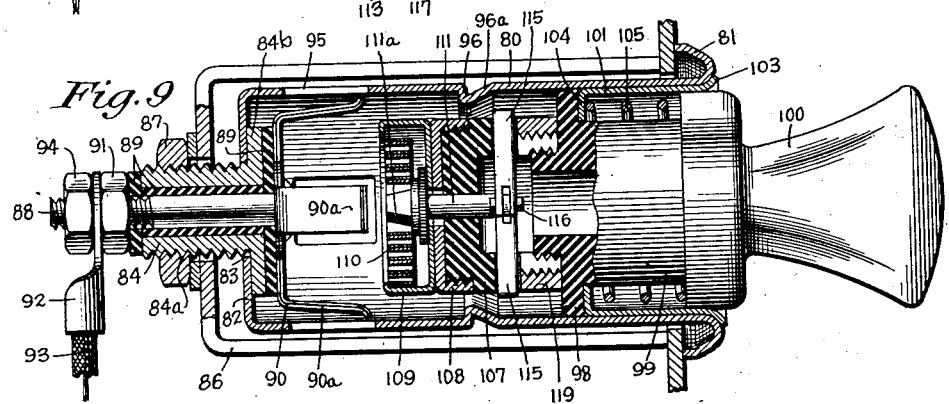
INVENTOR
*Herbert G. Lehmann,*
BY
ATTORNEY Patented Jan. 21, 1941

2,229,174

UNITED STATES PATENT OFFICE 2,229,174

CIGAR LIGHTER

Herbert G. Lehmann, Bridgeport, Conn., assignor to Automatic Devices Corporation, Bridgeport, Conn., a corporation of Connecticut Application December 31, 1937, Serial No. 182,746

20 Claims. (Cl. 219—32)

REISSUED
AUG 5 1941

This invention relates to cigar lighters and, more particularly, to an automatic cigar lighter adapted to be mounted on the dashboard of an automobile or the like.

In some of the current automatic cigar lighters, the circuit for the heating element is controlled by heat-responsive means positioned in heat-conducting relation with the heating element. The heating element is usually held in closed-circuit position by a latch which is released by the heat-responsive means.

According to the present invention, the heating element is so constructed and arranged that it itself will operate not only as a heating element but also as a heat-responsive means for releasing the latches for holding the heating element in closed-circuit position. With this construction, the circuit will be opened when the heating element has been heated to a predetermined definite heat and will function accurately since it is not affected by heat losses or other factors above-mentioned.

In carrying out the invention, a heating element is mounted on an igniting unit by having one end secured thereto, in fixed relation. The other end is disposed for movement relative to the igniting unit. The heating element is carried by a movable insulated support, which is yieldably mounted on the body of the igniting unit. The movable insulated support is provided with a pair of latches adapted to engage an abutment on the holder and normally hold the heating element and igniting unit in deep position in the holder in which position the circuit to the heating element is open.

When the operator desires to use the lighter, he merely grasps the handle and pulls it outwardly. The heating element will remain in deep position, but the igniting unit body will move outwardly a slight distance to a position in which the circuit is closed to the heating element and the igniting unit held there by the action of the latches. Upon the heating element attaining its predetermined heat, the movable end of the heating element will have expanded or flexed sufficiently to move the latches out of engagement with the abutment, whereby the insulated support moves under the urge of the yieldable mounting means and carries the heating element into open-circuit position and also releases the restraint on the igniting unit to outward pull so that the igniting unit can be readily removed from the holder.

The heating element may be of any material and of any shape. However, in the preferred form of the invention, the heating element is made of bimetallic material and is short and heavy, having a sufficient volume of metal to hold the heat long enough to permit the lighter to be used. With this heating element, the resistance is comparatively low so that the heating element is brought to the desired heat almost instantaneously, and the restraint of the igniting unit in its outward movement is merely momentary.

The holding device of the present invention is of unique construction in that it is insulated from the dashboard and will not close the circuit through the heating element until the igniting unit body has been moved outwardly, at which time contacts carried by the body will bridge the insulation and complete the circuit to the heating element.

In another form of the invention, an igniting unit, having the insulating support secured thereto, is positioned in a holder and yieldingly urged into a shallow open-circuit position.

As in the above form of the invention, the heating element is mounted on the igniting unit, with one end fixed thereto and the other disposed for relative movement. A pair of latches are connected to a movable part of the heating element and are carried by the insulating support on the igniting unit. When it is desired to use the lighter, the igniting unit is moved into deep circuit-closing position, in which position the latches engage an abutment on the holder. When the heating element has acquired its predetermined heat, it will have expanded and moved sufficiently to cause the latches to be released from the abutment. The igniting unit, which is now ready for use, moves into open-circuit position under the urge of yielding means. The movement into this open-circuit position will cause an audible click to indicate to the user of the device that it is heated to the desired temperature for use.

Other features and advantages will be apparent from the specification, taken in connection with the drawings, in which:

Figure 1 is a view, partly in section, of the igniting unit in inoperative position.

Fig. 2 is a longitudinal section of the device with the igniting unit in operative position.

Fig. 3 is a longitudinal section of the device, after the heating element has acquired its predetermined heat and the latches have been released.

Fig. 4 is a section taken along line 4—4 of Fig. 2 with the collar removed.

Fig. 5 is a section taken along line 5—5 of Fig. 3.

Fig. 6 is a perspective of the contact ring.

Fig. 7 is a view, partly in section, of a modified form of the invention with the igniting unit in open-circuit position.

Fig. 8 is a longitudinal sectional view of the modified form of the invention with the igniting unit in closed-circuit position.

Fig. 9 is a longitudinal sectional view of the device with the heating element having attained its predetermined heat and the latches released from the abutment.

According to the present invention, a sheet metal holder 20 is provided at its open end with a threaded portion 20a. The holder is adapted to be mounted on the dashboard of an automobile but insulated therefrom by means of an insulating sleeve 21 which is provided with an internal rib 22. A metal sleeve 23 is threaded into the bore of the insulating sleeve and into engagement with the internal rib. The metal sleeve is of such a diameter as to form a continuation of the inner surface of the internal rib and projects from the end of the insulating sleeve so as to pass through an aperture in a dashboard 24. A collar or escutcheon plate 25 is threaded on the metal sleeve and locks the insulating sleeve in a position extending from the back of the dashboard. The threaded end 20a of the holder is threaded into the other end of the insulating sleeve so as to form a continuation of the bore therein, as will be seen in Figs. 1 to 3. This provides a smooth bore for the reception of the igniting unit to be mounted in the holder.

Intermediate the ends of the holder, an abutment 26 is formed so as to extend into the holder. The abutment is formed with the side facing the open end of the holder tapered as at 26a and the other side thereof is formed with a slight 1° taper. This abutment may be formed by a separate member welded in place, by rolling an internal rib in the holder as shown in the preferred form of the invention, or by any other suitable means.

The holder 20 is closed at its other end by a wall 27 in which is mounted a bolt 28. The bolt is completely insulated from the wall by an insulating washer 29 provided with a neck projecting through the wall 27 and another insulating washer 30. A bimetallic contact member 31, having projecting contact fingers 31a, is positioned under the head of the bolt and clamped against the insulating washer 30 by a nut 32 threaded on the bolt. The nut also serves to lock the bolt and insulation in place in the aperture in the rear wall of the holder.

The contact 31 is connected to a source of energy by means of a connector lug 33 mounted on the bolt and connected to a conductor 34 which is connected to the source of energy in the automobile. The lug is locked in place by a nut 35.

A plurality of vent openings 36 are formed in the holder 20 adjacent the heating element to provide for air circulation which will cool the bimetallic contact fingers after the heating element has been energized.

The igniting unit, according to the present invention, has a main or insulating body 40 comprising an insulating collar 41 and a handle 42 threaded thereon. A movable member 43 is mounted to slide in the bore of the insulating body. The movable member is provided with an end abutment 44, adapted to slide in the bore of the handle. A spring 45 surrounds the movable member with one end engaging the end abutment and the other end engaging the insulating collar. The spring normally moves the movable member outwardly toward the front of the handle. The movable member is provided with a stop or shoulder 46 intermediate its ends which engages the collar 41. This prevents the movable member from moving too far in the other direction so as to compress the spring too much. When the stop or shoulder engages the collar, the pull on the handle is transmitted directly to the latches.

The other end of the movable member projects from the insulating body and is threaded to receive an insulating support 47, having a conducting cap 48 threaded thereon at its other end. A contact cup 49 is secured to the conducting cap in electrical engagement therewith, as shown in Figs. 2 and 3, and is adapted to engage the contacts 31a when moved into deep position on the holder.

A heating element 50 is mounted in the contact cup so as to have one end fixed thereto and the other end disposed for movement relative to the support.

A rotatable stud 51 is mounted for rotation in the insulating support and is provided at one end with a slot 52 in which is secured the movable end of the heating element. The stud is provided with a shoulder 53 which bears against an insulating washer 54 which insulates the same from the conducting cap and contact cup.

The insulating support is provided with a pair of guide slots 55 extending to the end thereof adjacent the main body of the igniting unit, as shown in Figs. 2 and 4, which are adapted to receive a pair of latches 56 pivotally mounted as at 57 to the ends of an arm 58. The arm is provided with a central aperture adapted to be secured to the end of the stud 51 as by heading over the end of the stud, as shown in Fig. 4, or by any other means. The arm will give the necessary leverage for moving the latches in response to the movement of the heating element. After the latches have been positioned in the guide slots and the arm secured to the stud, a collar 59 is threaded on the end of the insulating support to lock the assembly in place thereon.

When the heating element, latches, and collar have been assembled on the insulating support, the latter is threaded to the end of the movable member so that it is yieldably mounted on the igniting unit.

Clamped between the end of the handle and the insulating collar is a contact ring 62 provided with two pairs of contacts 63 and 64, adapted to lie in slots 65 and 66 in the handle. These contacts form bridging contacts for closing the circuit to the heating element, as will be later explained.

When the igniting unit is placed in the holder, it is normally held in deep position, as shown in Fig. 1. The latches are yieldingly mounted or normally biased to engage the walls of the holder, so that, as the igniting unit is pressed inwardly, they engage the tapering surface 26a and are moved inwardly and snap into latched relation when the heating element has been moved to deep position. In this position, the contacts 63, carried by the igniting unit, engage the internal rib on the insulating sleeve and, therefore, prevent the circuit from being closed to ground.

When it is desired to use the lighter, the user pulls on the igniting unit in the direction of the arrows in Fig. 2, moving the main body of the igniting unit outwardly and compressing the spring 45 until the shoulder 46 engages the insulating collar. In this position, contacts 63 will engage the metal sleeve and contacts 64 will engage the holder, and, as shown in Fig. 2, will bridge the insulation and connect the holder 20 to the metal sleeve, and thus to ground. This completes a circuit through the heating element to energize the same.

Upon the heating element being energized so as to attain its predetermined heat, the movable end of the heating coil will move sufficiently to rotate the stud and retract the latches from the abutments 26. As soon as the latches are retracted, the insulating support snaps outwardly under the urge of the spring 45 and moves the contact cup out of engagement with the contacts 31a in the base of the holder to open the circuit.

The movement of the insulating support, under the urge of the spring 45, will cause a resounding click when the insulating support hits the insulating collar 41 and will indicate to the user that the heating element has attained its predetermined heat.

Also, the retardation to the outward pull on the igniting unit will be removed when the heating element has attained its desired heat and the same will move out of the holder in response to the pull on the igniting unit by the user of the device.

Since the heating element comes to the desired heat substantially instantaneously, the pull on the igniting unit is practically continuous, the delay being merely momentary.

If, for any reason, the latches should fail to release or the heating element be held in closed-circuit position too long, the thermostatic contact fingers 31a will flex outwardly and open the circuit to prevent the heating element from burning out.

If the pull on the igniting unit handle be released before the heating element has attained its desired heat and the latches released, the spring 45 will pull the handle back into open-circuit position.

In another form of the invention, a holder 80 is provided with a rolled or outwardly flared end 81, adapted to engage the front face of a dashboard when the holder is positioned in an aperture therein. The other end of the holder 80 is closed by an end wall 82, provided with a central aperture 83, into which a sleeve 84, having external threads 84a and an outwardly projecting flange 84b, is threaded.

A locking stirrup or bracket 86 is threaded on the external threads of the sleeve and extends into a position to engage the back of the dashboard to lock the holder in place thereon. The stirrup is locked in place on the holder by a nut 87 threaded on the sleeve. A bolt 88 is mounted in the sleeve and is insulated therefrom by insulation 89. A contact 90, preferably of bimetallic material and provided with outwardly extending arms 90a, is positioned under the head of the bolt and clamped between the head of the bolt and the insulation, as shown in Fig. 8. The bolt, insulation and contact are clamped in the sleeve by a nut 91. The bolt is connected to a source of energy in the automobile by a connector lug 92 mounted thereon and secured to a conductor 93 connected to a battery or other suitable source of energy. The lug is locked in place by a nut 94.

Adjacent the bimetallic contacts, the holder is provided with vent openings 95 to permit air to circulate around the contacts to cool the same after the lighter has been used.

The holder is provided intermediate its ends with an internal abutment 96. The abutment is formed, in the herein preferred form of the invention, by rolling, although it can be formed separately and secured therein by welding or the like. It is so shaped as to provide a tapered surface 96a on the side of the abutment adjacent the open end of the holder and a slight taper on the other face thereof.

The igniting unit, in this form of the invention, comprises a body of insulation 98, having a reduced portion 99 to which is secured a handle 100. A friction sleeve 101 has a plurality of friction fingers 102 lanced therefrom. The fingers are adapted to engage the holder to prevent accidental removal of the igniting unit therefrom when in normal position. The sleeve is provided with an outer flared end 103 adapted to engage the rolled end 81 of the holder to limit the movement of the sleeve into the holder. The other end of the sleeve is provided with an inturned flange 104 adapted to be slidably mounted on the reduced portion on the body of insulation. An ejector spring 105 surrounds the reduced portion of the body of insulation with one end engaging the inturned flange on the friction sleeve and the other end engaging the handle threaded on the body of insulating material. The spring normally holds the igniting unit in shallow inoperative position.

The other end of the body of the insulating material is provided with a reduced neck 106 for receiving an insulating support 107. The insulating support has a conducting cap 108 threaded on its opposite end to which is mechanically and electrically secured a contact cup 109.

A heating element 110 is mounted in the contact cup with one end secured thereto and the other end disposed for relative movement with respect to the igniting unit. The heating element has a movable part thereof secured to a rotatable stud 111 by means of a slot 111a in the end thereof. The stud is rotatably mounted in the insulating support and is provided with a shoulder 112 adapted to engage an insulating washer 113 to be insulated from the conducting cap and contact cup. The other end of the insulated support is provided with a pair of guide slots 114 into which is positioned a pair of latches 115 pivoted at 116 to the ends of an arm 117.

The arm and latch assembly is slipped in the slots and secured to the end of the rotatable stud by heading over the same or in any other manner. After the latches are in place, a locking collar 119 is threaded on the end of the support. The insulating support with its assembled elements is then threaded into position on the reduced neck of the body of insulation of the igniting unit.

With the construction, the igniting unit is normally held in shallow open-circuit position. When it is desired to use the lighter, the igniting unit is pressed into deep circuit-closing position and the latches, which are normally yieldingly urged into engagement with the walls of the holder, will engage the tapered surface 96a of the abutment and move inwardly until the igniting unit is pushed past the abutment, at which time they spring out to engage the same and hold the contact cup for the heating element in engagement with the contacts in the base, thus closing a circuit through the heating element.

When the heating element attains its predetermined heat, the movable part will flex or move sufficiently to remove the latches from the abutment and the spring will cause the igniting unit to move into open-circuit position, which movement is accompanied by a click which will indicate to the user that the heating element has acquired its predetermined heat.

If the heating element is not released from circuit-closing position in its normal operation, the bimetallic elements in the base will flex and open the circuit to prevent the same from being burnt out.

Accordingly, the invention provides a means for holding the igniting unit in closed-circuit position and for releasing the heating element from such position when it has acquired a predetermined heat, the release of the holding means for the heating element being accomplished by the heating element itself, thus avoiding difficulties of operation caused by a poor transfer of heat to a separate heat-responsive means.

Variations and modifications may be made within the scope of this invention and portions of the improvements may be used without others.

I claim:

1. In an electric cigar lighter, a holder; an igniting unit mounted in the holder for complete removal for use; a heating element mounted on the igniting unit and adapted to be used to ignite smokers' articles when incandescent; means for normally holding the heating element and igniting unit in deep position on the holder; means for closing an energizing circuit through the heating element when the igniting unit is moved to an intermediate position on the holder, said holding means holding the heating element in the deep position against outward movement with the igniting unit; and means responsive to the expansion of the heating element when the latter has been heated to a predetermined heat to release the holding means whereby the heating element and igniting unit can be removed for use.

2. In an electric cigar lighter, a holder; an igniting unit mounted on the holder for complete removal for use; a bimetallic heating element mounted on the igniting unit and adapted to be used to ignite smokers' articles when incandescent; means for closing a circuit through the heating element; means for holding the heating element in circuit-closing position in the holder; and means responsive to the expansion of the bimetallic heating element, when the latter has been heated to a predetermined heat, to release the holding means.

3. In an electric cigar lighter, a holder; an igniting unit mounted on the holder for complete removal for use; a heating element mounted on the igniting unit and adapted to be used to ignite smokers' articles when incandescent, one end of the heating element being fixed to the igniting unit and the other end disposed for relative movement with respect to the igniting unit; means for holding the heating element in circuit-closing position in the holder; and means operable by the heating element for releasing the holding means when the heating element has expanded to the heating thereof to the desired heat.

4. In an electric cigar lighter, a holder; an igniting unit mounted in the holder for complete removal for use; a heating element mounted on the igniting unit and adapted to be used to ignite smokers' articles when incandescent; means for normally holding the igniting unit and heating element in deep inoperative position on the holder; means for closing an energizing circuit through the heating element when the igniting unit is moved to an intermediate position on the holder, said holding means holding the heating element in the deep position against outward movement with the igniting unit and comprising an abutment on the holder and latches on the igniting unit; and means responsive to the expansion of the heating element when the latter has been heated to a predetermined heat operable to release the latches from engagement with the abutment.

5. In an electric cigar lighter, a holder; an igniting unit mounted in the holder for complete removal for use; a heating element, of such resistance as will be brought to the desired heat substantially instantaneously upon being energized, mounted on the igniting unit and adapted to be used to ignite smokers' articles when brought to the desired heat; means for normally holding the igniting unit and heating element in deep inoperative position on the holder; means for closing an energizing circuit through the heating element when the igniting unit is moved to an intermediate position on the holder, said holding means delaying withdrawal of the heating element to said intermediate position with the igniting unit; and means responsive to the expansion of the heating element when the latter has heated to a predetermined heat to release the last-mentioned means.

6. In an electric cigar lighter, a holder; an igniting unit mounted on the holder for complete removal for use; a heating element mounted on the igniting unit, one end of the heating element being fixed to the igniting unit and the other end being disposed for relative movement; a rotatable stud mounted on the heating element and having one end secured to the movable end of the heating element; means for closing an energizing circuit through the heating element; and means for holding the heating element in circuit-closing position in the holder comprising means mounted on the rotatable stud and engaging an abutment formed on the holder and adapted to be released therefrom by rotation of the stud due to the heating element expanding when it has been heated to a predetermined heat, whereby the igniting unit and heating element are free to be removed from the holder.

7. In an electric cigar lighter, a holder; an igniting unit mounted on the holder for complete removal for use; a heating element mounted on the igniting unit, one end of the heating element being fixed to the igniting unit and the other end being disposed for relative movement; a rotatable stud mounted on the heating element and having one end secured to the movable end of the heating element; means for closing an energizing circuit through the heating element; and latch means pivoted to the rotatable stud and engaging an abutment formed on the holder and adapted to be released therefrom by rotation of the stud due to the heating element expanding when it has been heated to a predetermined heat, whereby the igniting unit and heating element can be removed from the holder.

8. In an electric cigar lighter, a holder; an igniting unit mounted on the holder for complete removal for use; a heating element mounted on the igniting unit, one end of the heating element being fixed to the igniting unit and the other end being disposed for relative movement; a rotatable stud mounted on the igniting unit and having one end secured to the movable end of the heating element; means for closing an energizing circuit through the heating element; latch means pivoted to the rotatable stud; guide slots in the igniting unit through which the latches extend; and an abutment formed on the holder and adapted to be engaged by the latches to hold the heating element in deep position and to be released therefrom by rotation of the stud due to the heating element expanding when it has been heated to a predetermined heat, whereby the igniting unit and heating element can be removed from the holder.

9. In an electric cigar lighter, a holder; an igniting unit mounted on the holder for complete removal for use; a heating element mounted on the igniting unit, one end of the heating element being fixed to the igniting unit and the other end being disposed for relative movement; a rotatable stud mounted on the igniting unit and having one end secured to the movable end of the heating element; means for closing an energizing circuit through the heating element; latch means pivoted to the rotatable stud; and an internal rib formed in the holder to provide an abutment to be engaged by the latches, the latches being released from the abutment by rotation of the stud due to the heating element expanding when it has been heated to a predetermined heat, whereby the igniting unit and heating element can be removed.

10. In an electric cigar lighter, a holder; an igniting unit mounted on the holder for complete removal for use; a bimetallic heating element mounted on the igniting unit; means for closing a circuit through the heating element; means for holding the heating element in circuit-closing position in the holder; and means responsive to the expansion of the bimetallic heating element, when the latter has been heated to a predetermined heat, to release the holding means, said means for closing the circuit through the heating element including a bimetallic contact in the base adapted to open the circuit through the heating element should the latter be retained too long in circuit-closing position.

11. In an electric cigar lighter, a holder; an igniting unit mounted in the holder for complete removal for use; a heating element yieldably mounted on the igniting unit and adapted to be used to ignite smokers' articles when incandescent; means for normally holding the igniting unit in deep inoperative position on the holder; means for closing an energizing circuit through the heating element when the igniting unit is moved to an intermediate position on the holder; means for holding the heating element in the deep position against outward movement with the igniting unit; and means responsive to the expansion of the heating element when the latter has been heated to a predetermined heat to release the holding means, whereby the yielding means moves the heating element to open-circuit position.

12. In an electric cigar lighter, a metallic holder having contacts thereon forming a part of an energizing circuit; an insulating means for mounting the holder on the grounded dashboard of an automobile; an igniting unit mounted on the holder for use; a heating element carried by the igniting unit; and means for closing a circuit through the heating element including a contact carried by the igniting unit and operable upon movement of at least a portion of the igniting unit to bridge the insulating means and electrically connect the heating element circuit to the dashboard.

13. In an electric cigar lighter, a metallic holder having contacts thereon forming a part of an energizing circuit; means for insulatedly mounting the holder on a grounded dashboard of an automobile, comprising an insulating block clamped to the dashboard of the automobile and provided with means for securing the holder thereto; an igniting unit mounted on the holder for removal for use; and means for closing said circuit through the heating element including a means operable by movement of at least a portion of the igniting unit to bridge the insulating block to connect the circuit to the dashboard of the automobile for energizing the heating element.

14. In an electric cigar lighter, a metallic holder; means for insulatedly mounting the holder on a dashboard of an automobile, comprising an insulating block clamped to the dashboard of the automobile and provided with means for securing the holder thereto; an igniting unit mounted on the holder for removal for use; and means on the cigar lighter including a bridging contact movable from a normal open-circuit position to simultaneously connect to the metallic holder and dashboard for closing the circuit through the heating element to the dashboard of the automobile for energizing the heating element.

15. In an electric cigar lighter adapted to be mounted on the dashboard of an automobile, an insulating sleeve having an internal rib formed therein; a sleeve of conducting material secured in one end of the insulating sleeve and abutting against the internal rib and adapted to extend from the end of the insulating sleeve and through an opening in the dashboard; a collar threaded on the sleeve for clamping the dashboard between the insulating sleeve and the collar; a holder secured to the other end of the insulating sleeve; an igniting unit mounted in the holder and normally held in deep position therein; and contacts carried by the igniting unit for closing a circuit through the heating element when the igniting unit is moved out of deep position, said contacts normally resting on the internal rib on the insulating sleeve in open-circuit position when the igniting unit is in deep position.

16. In an electric cigar lighter adapted to be mounted on the dashboard of an automobile, an insulating sleeve having an internal rib formed therein; a sleeve of conducting material secured to one end of the insulating sleeve and adapted to extend through an opening in the dashboard; a collar threaded on the sleeve for clamping the dashboard between the insulating sleeve and the collar; a holder secured to the other end of the insulating sleeve; an igniting unit mounted in the holder and normally held in deep position therein; and contacts carried by the igniting unit for closing a circuit through the heating element when the igniting unit is moved out of deep position, said contacts being constructed and arranged to bridge the insulation and connect the holder to the metallic sleeve to complete the circuit to the heating element when the igniting unit is moved out of deep position.

17. In an electric cigar lighter, a holder insulatedly mounted on the dashboard of an automobile or the like; an igniting unit mounted on the holder for complete removal for use, said igniting unit comprising a body of insulating material having an internal recess; a movable member mounted in the recess and having an insulating support mounted thereon; yielding means for urging the insulated support into engagement with the insulated body of the igniting unit; a heating element mounted on the movable support; latch means mounted on the insulating support; an abutment on the holder adapted to be engaged by the latch means in normal position to hold the heating element in deep position in the holding means, said yielding means permitting the insulated body of the igniting unit to be moved outwardly in the holder; contacts carried by the insulated body for bridging the insulation of the holder when in the last-named position for completing a circuit through the heating element; and means connecting the latches to the heating element for releasing the latches when the heating element attains a predetermined temperature.

18. In an electric cigar lighter, a holding device; an igniting unit mounted in the holding device for complete removal for use; a heating element carried by the igniting unit and adapted to be used to ignite smokers' articles when incandescent; latch means carried by the igniting unit and yieldingly engaging the walls of the holder; means for yieldingly holding the igniting unit in shallow open-circuit position; means for closing the circuit through the heating element when the heating element is moved into deep position; an abutment formed on the holder for engagement by the latches when the heating element is moved into deep position; and means, responsive to the expansion of the heating element, for releasing the latches whereby the yielding means moves the igniting unit into open-circuit position.

19. In an electric cigar lighter, a holding device; an igniting unit mounted in the holding device for complete removal for use; a heating element mounted on the igniting unit, one end of the heating element being fixed to the igniting unit and the other end being mounted for relative movement thereto; a rotatable stud carried by the igniting unit and connected to the movable end of the heating element; latch means secured to the rotatable stud, said means being yieldingly urged into engagement with the walls of the holder; means for yieldingly holding the igniting unit in shallow open-circuit position; means for closing the circuit through the heating element when the heating element is moved into deep position; an abutment on the holder for engagement by the latches when the heating element is moved into deep position; and means, responsive to the expansion of the heating element, for releasing the latches whereby the yielding means moves the igniting unit into open-circuit position.

20. In an electric cigar lighter, a holding device; an igniting unit mounted in the holding device for complete removal for use; a heating element carried by the igniting unit; latch means carried by the igniting unit and yieldingly engaging the walls of the holder; means for yieldingly holding the igniting unit in shallow open-circuit position; means for closing the circuit through the heating element when the heating element is moved into deep position; an abutment on the holder for engagement by the latches when the heating element is moved into deep position; and means, responsive to the expansion of the heating element, for releasing the latches whereby the yielding means moves the igniting unit into open-circuit position, said circuit-closing means including bimetallic contacts adapted to open the circuit to the heating element, should the heating element be retained too long in deep circuit-closing position.

HERBERT G. LEHMANN.